3,298,032
SNAP-ON LIFT FRONT LENS
Robert G. Sielisch, 1440 Irving Park Road,
Chicago, Ill. 60613
Filed July 2, 1964, Ser. No. 379,883
9 Claims. (Cl. 2—13)

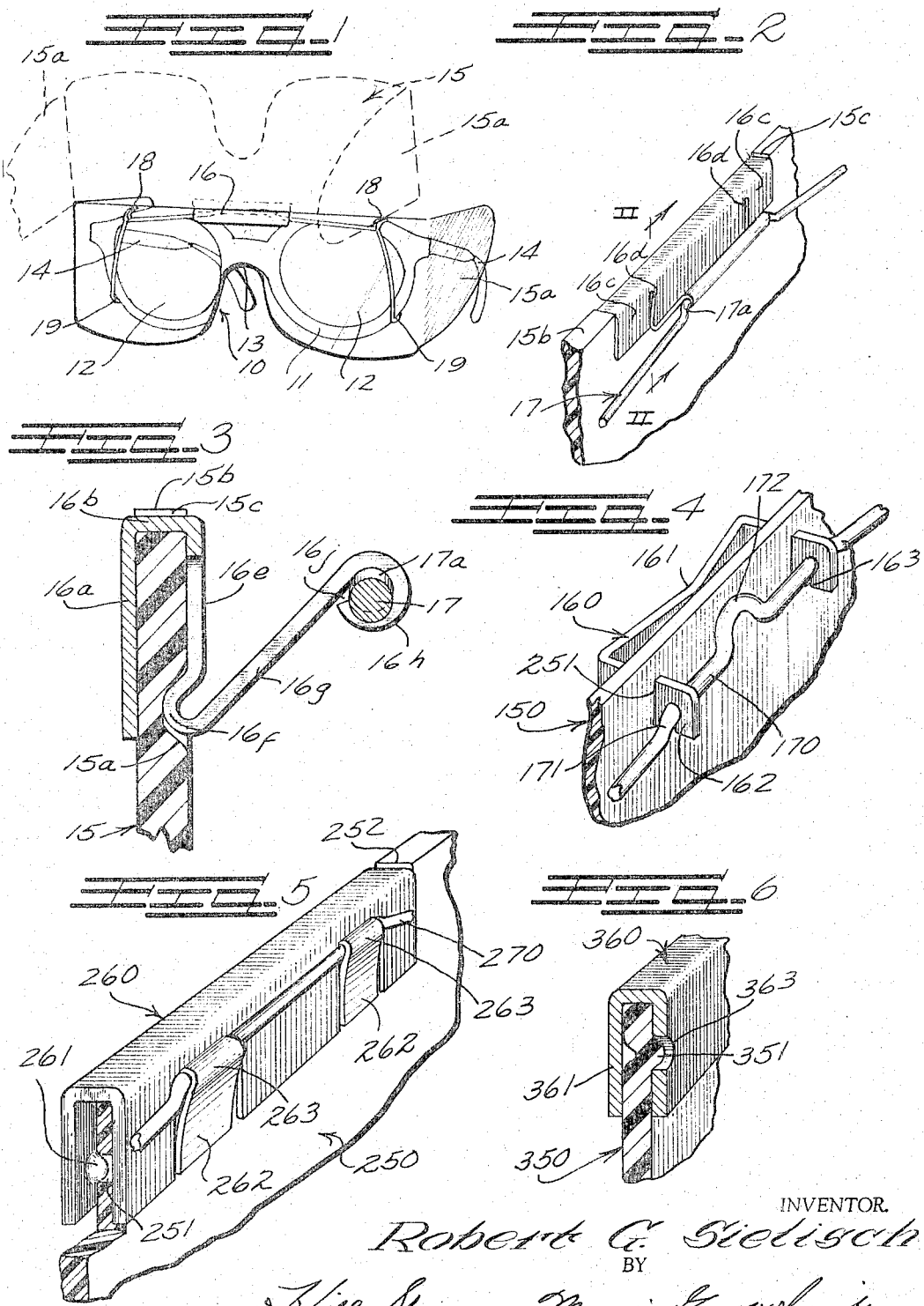

The present invention relates to protective glasses and is, more particularly, concerned with the provision of an improved lightweight flip-up lens constructed as an auxiliary clip-on lens for conventional glasses.

It is, of course, well known in the art pertaining to industrial protective glasses, as well as that of sun glasses, to provide pivotally movable auxiliary lenses. Such prior art lenses have included both clear and colored lens materials pivotally secured by a hinge device to conventional eyeglasses or protective goggles. Major problems still remain in the field of protective eyeglasses, however, and include overcoming inconvenience, annoyance, and expensive maintenance. As those familiar with the art of protective glasses are aware, there is a general reluctance on the part of many industrial workers to wear protective eye coverings of any sort and this reluctance is increased with respect to auxiliary lenses that may be unduly heavy and cumbersome. Where the worker views such auxiliary lenses as a nuisance, his employer finds it very desirable to eliminate such nuisance characteristics if possible without reducing the efficiency of the devices or their inexpensive maintenance in the field.

It is, accordingly, of substantial importance to provide an efficient auxiliary lens mechanism capable of providing complete eye protection at minimum initial and maintenance cost, coupled with an extreme lightness and capability for universal fit whereby protection is afforded with a minimum of annoyance to the wearer.

In accordance with a preferred form of the present invention, a thin sheet plastic lens is provided. This lens is separably secured by readily demountable hinge clip means to a simple spring support wire resiliently securing the lens to substantially any form of conventional glasses. The clip, lens and wire combination is also constructed to provide a biasing force tending to maintain the lens in preferably selected positions. As commercially fabricated, the device of the invention has been found to weigh substantially less than an ounce. The device is readily movable into positions of optimum utility, or entirely out of the user's vision. It is adaptable to substantially any conventional pair of eyeglasses.

In addition to the wide utility of the device, as above observed, the sheet plastic lens of the present invention is readily detachable from its supporting clip and wire in a manner permitting simple maintenance of the device in the field and replacement of the lens material should the original lens become scratched, broken, or otherwise damaged or should it become desirable to substitute a lens of differing color or filtering capability. All adjustments, disassembly and reassembly steps are simply performed and may, in most cases, be undertaken without special tools.

It is, accordingly, an object of the present invention to provide a simple, inexpensive, universally adaptable flip-up lens device.

Another object of the present invention is to provide an extremely lightweight auxiliary flip-up lens device for utilization with conventional eyeglasses.

Yet a further object of the invention is the provision of a simple flip-up lens and mount therefor capable of ready disassembly and reassembly in the field without special tools.

A feature of the invention resides in the provision of a sheet material flip-up lens having an interengaging retaining means for securement to a support wire in a manner permitting assembly and removal of the lens therefrom without tools.

Still another feature of the invention resides in the provision of simple means for maintaining the auxiliary lens in adjusted position.

Yet a further object of the invention is to provide a flip-up auxiliary lens of sufficient lightness to eliminate wearer annoyance heretofore encountered with the utilization of auxiliary lens eyeglass devices.

Still other and further objects and features of the present invention will at once become apparent to those skilled in the art from a consideration of the attached drawings and related specification, wherein several embodiments of the invention are shown by way of illustration only, and wherein:

FIGURE 1 is an elevational view of a preferred embodiment of the auxiliary lens device in position on a conventional pair of eyeglasses;

FIGURE 2 is an isometric view illustrating the construction of the flip-up lens, clip and supporting wire interrelationship as employed in the device of FIGURE 1;

FIGURE 3 is a cross-sectional view of the structure illustrated in FIGURE 2 taken along line II—II;

FIGURE 4 is a second embodiment of retaining clip and lens combination;

FIGURE 5 is a further modified form of the invention illustrated in FIGURES 2 and 4; and FIGURE 6 is an isometric view of still a further embodiment of the invention illustrated in FIGURES 2, 4 and 5.

As shown on the drawings:

As may readily be seen from a consideration of FIGURE 1, the device of the present invention is intended for use with any form of conventional eyeglasses such as those illustrated at 10. Such glasses conventionally have a frame 11 supporting a pair of lenses separated by a nose bridge frame portion 13 and are retained on the wearer by means of temples 14. Conventionally, such glasses have clear colorless lenses. When it becomes necessary for the wearer to view an unusually bright scene or object, it is a conventional practice for him to obtain glasses having colored lenses ground to his prescription or, alternatively, to obtain fixed-position clip-on colored lenses or to employ separate colored glasses not ground to his individual prescription. None of these alternatives is completely satisfactory and it is, accordingly, an object of the present invention to provide auxiliary flip-up clip-on lens apparatus having optimum utility and minimum annoyance.

As illustrated in FIGURE 1, such a flip-up lens preferably comprises a sheet lens 15 carried by a U-shaped spring clip generally indicated at 16 which is in turn pivotally carried by wire supporting member 17. The wire 17 is provided with permanent deformations at 18 and 19 for resiliently engaging the outermost edges of the eyeglass frames 11. With this arrangement, the lens 15 is securely mounted to the eyeglass frame in a resilient fashion. With such arrangement, the vertical position of the lens 15, which is determined by the vertical position of the clip 16, may readily be modified by manual deformation of the wire 17 beyond its elastic limit. By such bending of the wire 17, the clip and its lens 15, may readily be mounted upon substantially any size or shape eyeglass frame. As shown, the lens 15 is provided with side shield portions 15a which are integral with the main forward facing lens portion and extend generally parallel to and outside of the temples 14. It will be readily understood, however, that such side shield portions may be eliminated wherever desired.

Details of construction are particularly important in connection with the auxiliary lens device of the present invention. These details may more clearly be seen from a consideration of FIGURES 2 and 3. As may there be seen, clip 16 is provided with a flat forwardly facing wall 16a, a bight portion 16b and a rearward wall portion 16c substantially parallel to the wall 16a. Slots are provided in the rearward wall, as shown at 16d separating a spring tongue 16e from the main body of the clip. This tongue 16e is provided with a forwardly deformed projection 16f and is then reversely bent as at 16g and rolled over wire 17, as at 16h. Deformation of the tongue at 16h is such as to provide a snug contact with the wire 17, a condition which is assured by leaving a small space 16j between the end of the clip tongue 16h and the portion 16g thereof. The sheet plastic lens 15 is provided with a longitudinal groove 15a. This groove may be machined into the lens or pressed into the plastic by permanent deformation thereof. In commercial practice, I have successfully pressed the groove 15a into the plastic while supporting the forward face of the plastic, thereby providing groove 15a on the reverse face without simultaneously providing a raised projection on the forward face.

As may similarly be seen from a consideration of FIGURES 2 and 3, the uppermost edge 15b of lens 15 is notched as at 15c to a depth slightly greater than the thickness of the bight portion 16b of the clip 16. The notch 15c extends the full length of the clip 16 and provides, when the clip is in the position illustrated in FIGURES 2 and 3, a recess preventing any movement of the clip 16 longitudinally of the lens 15. As a result of the spring projection 16f co-operating with the recess 15c, it will be seen that the clip 16 is tightly held in assembled relation with the lens 15.

Clip 16 is positively positioned longitudinally of the the wire 17 by means of a transverse kink placed in the wire at both points of emergence of the wire from the rolled portion 16h of the clip 16. This transverse kink, shown in FIGURES 2 and 3 at 17a, positively prevents movement of the clip 16 along the wire 17 and accordingly provides positive longitudinal, or horizontal, positioning of the lens 15 relative to the eyeglasses 10.

In operation, the embodiment illustrated in FIGURES 1, 2 and 3 is extremely efficient and simple to manipulate. By constructing the clip 16 of spring metal, it will be observed that by grasping the clip walls 16a and 16g between the finger and thumb, a vertical movement of the hand, as shown in FIGURE 3, will tend to cause the projection 16f to bend slightly away from the recess 15a, thereby permitting simple removal of the clip from the lens. Similarly, the lens may be readily vertically slipped back into the clip between the walls 16a and 16e. By providing the notch 15c in the top edge 15b of the lens 15, accurate positioning of the clip is assured. In assembly, one edge of the clip 16 may be seated against one end wall of the notch 15c and with the parts in this position, the other end of the clip may be forced downwardly against the lens, slipping the entire clip into its final position. Without the utilization of the notch, exact positioning of the lens relative to the clip would be much more difficult. Use of the notch 15c permits utilization of a groove 15a having a length negligibly longer than the width of the tongue 16g and the projection 16f. This is true since by using the notch as above set forth, it is impossible for the projection 16f to be shifted any appreciable amount longitudinally of the lens relative to the groove 15a.

As a result of the simple detent interrelationship between the clip 16 and the lens 15, changing lenses in the field is a simple matter. Accordingly, if the inexpensive sheet plastic lens become pitted or otherwise is rendered unsatisfactory, it may be removed and replaced in a moment. Similarly, should it become desirable to change the color of the lens or to substitute a side shield lens in place of a lens without side shields, or vice versa, such changes may be accomplished at a moment's notice.

Modifications of the specific hinge-lens-support wire combination may be accomplished readily within the spirit of this invention. For example, modified forms are illustrated at FIGURES 4, 5 and 6. In FIGURE 4, clip 160 is provided with legs 162 passing through apertures 251 in lens 150. Each of the legs 162 is provided with an eared slot 163 permitting wire 170 to be snapped vertically upwardly into the assembled position shown in FIGURE 4. Kinks 171 operate in the same manner as kinks 17a in the embodiment illustrated in FIGURES 1 through 3 to prevent longitudinal movement of the clip 160 relative to wire 171. Clip 160 is indented as at 161 to provide a positive bias against the lens 150, firmly gripping the lens snugly between indentation 161 and the central portion 172 of wire 170. By providing the upwardly directed hump 172 in the wire 170, it will be observed that the lens 150 will be resiliently held in the position shown in FIGURE 4, or, alternatively, in a vertically upright, inoperative position as illustrated in the dotted line position of FIGURE 1. The hump 172 acts, in such case as a snap action detent in which the lens moves over center from the position illustrated into a position in which the lens 150 is on the opposite side of the hump 172. As in the case of the modified form shown in FIGURES 1 through 3, the device of FIGURE 4 may readily be disassembled by springing the wire 170 downwardly past the eared notches 163, permitting removal of the clip 160 from the lens 150.

In the embodiment shown in FIGURE 5, clip 260 is similar in its operation to the clip 16 shown in FIGURES 1 through 3. Instead of providing detent projection means similar to 16f at the rear of the clip, however, small detent dimples 261 are provided on the inside of the front clip wall. These dimples 261 co-operate with apertures 251 in lens 250 to retain the clip 260 firmly in position. As in the embodiment shown in FIGURES 2 and 3, lens 250 is provided with a notched upper surface, as at 252, thereby positively positioning the clip 260 longitudinally relative to the lens. As shown, the wire 270 is retained in co-operative relation with the clip 260 by means of spring flaps 262 having enlarged tunnel-like portions 263. Wire 270 may be kinked to prevent its longitudinal movement relative to flaps 262 and the springiness of the flaps 262 causes tight engagement between the clip and the wire. It will be manifest that the dimple 261 could as well be carried by the rear wall of the clip 260 should it be desired that the front wall of the clip be provided without indentation.

In the embodiment illustrated in FIGURE 6, the clip 360 is provided with a recess 363 for co-operation with a projecting dimple 351 on the lens 350. Essentially, this is a reverse form of the modification shown in FIGURE 5. It will be understood in this connection, of course, that if desired, in the embodiment shown in FIGURES 2 and 3, the front surface of the lens 15 may be provided with a slight projection corresponding to the position of the recess 15a for co-operation with a longitudinal recess, not shown, in the wall 16a. Such an arrangement would provide a detent action at both the front and the rear of the lens 15 and would, of course, permit deformation of the groove 15a by stamping the groove without first supporting the forward face of the lens 15.

As noted above, manufacture of the flip-up of the present invention has provided an auxiliary lens weighing an ounce or less, even including the construction having side shields. In practice, this is accomplished by utilization of sheet plastic as the lens material and spring sheet metal for the clip. It has been found that this negligible weight added to the eyeglasses already being worn by the wearer creates a minimum of annoyance and has been readily accepted.

It will be understood that variations and modifications may be made in the specific configurations of the clip, lens, and supporting wire illustrated without departing from the scope of the novel concepts of this invention. For example, it will be seen that the hump 172 may be similarly applied to the wire 270 in FIGURE 5 if desired.

Further, it is clear that while I have illustrated a lens construction using a uniform thickness sheet material approximately .040 inch thick, the phrase "thin sheet material" is intended to include rolled or molded lens configurations of thickness substantially greater than the thickness illustrated. It is, accordingly, my intention that the scope of the invention be limited solely by that of the hereinafter appended claims.

I claim as my invention:

1. In combination in a flip-up, clip-on eyeglass lens device for use with a face-mounted frame, a support wire having securing means for attachment to said frame, a flip-up lens, spring metal retaining clip means substantially shorter in length than said lens removably secured to said lens and positively positioned longitudinally with respect thereto, said lens having recess means cut therein generally centrally thereof receiving the longitudinal ends of said clip means to thereby position said clip means generally centrally with respect to said lens, and means on said clip co-operating with said wire pivotally securing said clip to said wire in a fixed longitudinal position thereon.

2. In combination in a flip-up, clip-on eyeglass lens device for use with a face-mounted frame, a support wire having securing means for attachment to said frame, a flip-up lens constructed of thin sheet material, spring metal retaining clip means substantially shorter in length than said lens, co-operating detent means on said clip and on said lens separably retaining them in assembled relation, recess means generally centrally of said lens co-operating with axially facing abutment surfaces on said clip to positively maintain said clip in a fixed generally central longitudinal position relative to said lens, and means pivotally securing said clip to said wire in a fixed axial position thereon.

3. In combination in a flip-up, clip-on eyeglass lens device for use with a face-mounted frame, a support wire having securing means for attachment to said frame, a flip-up lens constructed of thin sheet material, spring metal retaining clip means substantially shorter in length than said lens, co-operating detent means on said clip and on said lens resiliently and separably retaining them in assembled relation, recess means in said lens co-operating with axially facing abutment surfaces on said clip positively maintaining said clip in a fixed longitudinal position relative to said lens, means integral with said clip resiliently wrappingly engaging said wire pivotally securing said clip to said wire, and abutment means on said wire co-operating with said means integral with said clip maintaining said clip in a fixed longitudinal position on said wire.

4. In combination in a flip-up, clip-on eyeglass lens device for use with a face-mounted frame, a support wire having securing means for attachment to said frame at horizontally spaced points, a flip-up lens constructed of thin sheet material, spring metal retaining clip means substantially shorter in length than said lens, co-operating detent means on said clip and on said lens resiliently and separably retaining them in assembled relation, recess means in said lens co-operating with axially facing abutment surfaces on said clip for positively maintaining said clip in a fixed longitudinal position relative to said lens, means integral with said clip resiliently wrappingly engaging said wire frictionally pivotally securing said clip to said wire, and abutment means on said wire co-operating with said means integral with said clip maintaining said clip in a fixed longitudinal position on said wire.

5. In combination in a flip-up, clip-on eyeglass lens device for use with a face-mounted frame, a support wire having hook means for resiliently securing the wire to said frame at spaced points, a flip-up lens constructed of thin sheet material, spring metal retaining clip means substantially shorter in length than said lens, co-operating detent means on said clip and on said lens resiliently and separably retaining them in assembled relation, recess means in said lens co-operating with axially facing abutment surfaces on said clip positively maintaining said clip in a fixed longitudinal position relative to said lens, means on said clip surrounding said wire pivotally securing said clip to said wire, and abutment means on said wire co-operating with said means on said clip maintaining said clip in a fixed longitudinal position on said wire, said co-operating detent means comprising a longitudinally extending groove in said lens and a resilient longitudinally extending projection on said clip co-operating therewith.

6. In combination in a flip-up, clip-on eyeglass lens device for use with a face-mounted frame, a support wire having hook means for resiliently securing the wire to said frame at spaced points, a flip-up lens constructed of thin sheet material, spring metal retaining clip means, co-operating detent means on said clip and on said lens resiliently and separably retaining them in assembled relation, recess means in said lens co-operating with axially facing abutment surfaces on said clip positively maintaining said clip in a fixed longitudinal position relative to said lens, and means on said clip surrounding said wire pivotally securing said clip to said wire, abutment means on said wire co-operating with said means on said clip maintaining said clip in a fixed longitudinal position on said wire, said co-operating detent means comprising a longitudinally extending groove in said lens and a resilient longitudinally extending projection on said clip co-operating therewith, and said recess means comprising a notch cut in the uppermost edge of said lens seating the entire length of said clip.

7. In combination in a flip-up, clip-on eyeglass lens device for use with a face-mounted frame, a support wire having securing means for attachment to said frame at horizontally spaced points, a flip-up lens constructed of thin sheet material, spring metal retaining clip means substantially shorter in length than said lens, co-operating detent means on said clip and on said lens resiliently and separably retaining them in assembled relation, recess means in said lens adjacent the central portion thereof co-operating with axially facing abutment surfaces on said clip positively maintaining said clip in a fixed longitudinal position relative to said lens, means integral with said clip resiliently wrappingly engaging said wire frictionally pivotally securing said clip to said wire, and abutment means on said wire co-operating with said means integral with said clip maintaining said clip in a fixed longitudinal position on said wire, said recess means in said lens comprising a pair of apertures and said clip comprising a body portion having ears thereon projecting through said apertures in engagement with said wire.

8. In combination in a flip-up, clip-on eyeglass lens device for use with a face-mounted frame, a support wire having securing means for attachment to said frame, a flip-up lens constructed of thin sheet material, spring metal retaining clip means substantially shorter in length than said lens, co-operating detent means on said clip and on said lens resiliently and separably retaining them in assembled relation, recess means in said lens co-operating with axially facing abutment surfaces on said clip positively maintaining said clip in a fixed longitudinal position relative to said lens, means pivotally securing said clip to said wire in a fixed axial position thereon, and resilient means on said wire providing an over-center detent co-operation between said wire and said clip requiring said clip to assume either a lens-operative or a lens-inoperative condition.

9. In combination, in a flip-up, clip-on eyeglass lens device for use with a face-mounted frame, a support wire having securing means for attachment to said frame, a flip-up lens constructed of thin sheet material, spring metal retaining clip means substantially shorter in length than said lens removably secured to said sheet material and positively positioned longitudinally with respect thereto, said lens having recess means cut therein generally centrally thereof receiving the longitudinal ends of said clip means to thereby position said clip means generally centrally with respect to said lens, and means on said clip co-operating with said wire pivotally securing said clip to said wire in a fixed longitudinal position thereon, said flip-up lens comprising a thin sheet of transparent plastic material having integral rearwardly extending side shield portions.

References Cited by the Examiner

UNITED STATES PATENTS

| | | | |
|---|---|---|---|
| 1,899,905 | 2/1933 | Uhlemann | 351—57 X |
| 2,270,028 | 1/1942 | Anderson | 2—8 |
| 2,714,717 | 8/1955 | Allman | 351—47 X |
| 2,825,066 | 3/1958 | Chundelak | 351—48 |

FOREIGN PATENTS

| | | |
|---|---|---|
| 1,104,664 | 6/1955 | France. |
| 795,810 | 5/1958 | Great Britain. |

JORDAN FRANKLIN, *Primary Examiner.*

J. R. BOLER, *Assistant Examiner.*